United States Patent [19]

Rogers, Jr.

[11] 4,218,075
[45] Aug. 19, 1980

[54] PASSIVE SEAT BELT SYSTEM HAVING LAP BELT LIFTER

[75] Inventor: Lloyd W. Rogers, Jr., Utica, Mich.

[73] Assignee: General Motors Corporation, Detroit, Mich.

[21] Appl. No.: 965,310

[22] Filed: Dec. 1, 1978

[51] Int. Cl.³ .............................................. B60R 21/10
[52] U.S. Cl. ..................................... 280/804; 280/803
[58] Field of Search .............. 280/804, 802, 806, 808, 280/803; 297/469, 475, 481, 486

[56] References Cited

U.S. PATENT DOCUMENTS

| | | | |
|---|---|---|---|
| 3,680,883 | 8/1972 | Keppel et al. | 280/804 |
| 3,815,934 | 6/1974 | Weststrate | 280/804 |
| 3,827,714 | 8/1974 | Lefeuvre | 280/804 |
| 3,831,974 | 8/1974 | Keppel | 280/804 |
| 3,882,955 | 5/1975 | Kaneko et al. | 280/804 |
| 3,889,971 | 6/1975 | Kazaoka et al. | 280/804 |
| 4,013,306 | 3/1977 | Imabuchi et al. | 280/803 |

FOREIGN PATENT DOCUMENTS 1496399  12/1977  United Kingdom .

OTHER PUBLICATIONS

"Irvin's Passive Seat Belt Concept...", *Irvin Industries*, description provided at demonstration, sponsored by the American Belt Council, Capital Building, Washington, D.C., Jul. 19-20, 1978.

*Primary Examiner*—John J. Love
*Assistant Examiner*—Donn McGiehan
*Attorney, Agent, or Firm*—Charles E. Leahy

[57] ABSTRACT

A passive lap and shoulder belt system for a motor vehicle includes a shoulder belt having an outboard end attached either to the roof rail or the door window frame and an inboard end suitably mounted inboard the occupant. The lap belt has an outboard end mounted on the door and an inboard end suitably mounted inboard the occupant. The shoulder belt and lap belt each have a retractor at one of their belt ends. A track extends longitudinally forward from the shoulder belt retractor and movably mounts a shoulder belt carriage which slidably engages the shoulder belt. A fixed length lift cable extends slidably through the shoulder belt carriage and has an upper end mounted adjacent the rear end of the track and a lower end connected to the lap belt. A suitable drive device moves the shoulder belt carriage forwardly along the track when the door is opened to thereby dispose the shoulder belt forwardly of the occupant and move the lift cable upwardly and forwardly to lift the lap belt upwardly and forwardly away from the seated occupant to facilitate occupant ingress and egress.

3 Claims, 2 Drawing Figures

PASSIVE SEAT BELT SYSTEM HAVING LAP BELT LIFTER

The invention relates to a passive occupant restraint system and more particularly to a lap and shoulder belt system wherein a power driven shoulder belt carriage simultaneously moves the shoulder belt forwardly and pulls a lap belt lift cable to lift the lap belt upwardly and forwardly.

BACKGROUND OF THE INVENTION

It is well known to restrain an occupant in a seat by an automatically deployed shoulder belt extending diagonally across the upper torso and lap belt extending across the lower torso.

U.S. Pat. No. 3,680,883, issued to Keppel et al, discloses a retractor mounting the outboard shoulder belt end on the vehicle roof and a lap belt retractor mounting the outboard lap belt end on the door. A shoulder belt carriage slidably receives the shoulder belt and moves fore and aft along a roof rail mounted track to unwind shoulder belt from the shoulder belt retractor when the door is opened and stow the shoulder belt forwardly of the seated occupant. A lap belt carriage is mounted on the door by an upwardly inclined door mounted track and moves fore and aft to unwind lap belt from the lap belt retractor when the door is opened and lift the lap belt upwardly and forwardly from the occupant. U.S. Pat. No. 3,882,955, issued to Kaneko, discloses a similar lap and shoulder belt system where the shoulder belt is attached to the door and the track for the shoulder belt carriage extends along the door window frame.

SUMMARY OF THE INVENTION

The present invention provides the shoulder belt movement and lap belt movement of Keppel and Kaneko without the use of a door mounted lap belt carriage track or the use of a lap belt carriage drive device separate from the drive mechanism of the shoulder belt carriage.

More particularly, the present invention provides a new and improved passive lap and shoulder belt arrangement wherein a fixed length lift cable has an upper end attached to the roof rail, a lower end connected to the lap belt, and an intermediate portion slidably carried by a shoulder belt carriage so that forward movement of the carriage lifts the cable to lift the lap belt upwardly and forwardly from the seated occupant.

According to the invention, a shoulder belt has a retractably mounted outboard end and an inboard end mounted adjacent the occupant hip. A lap belt has an outboard end retractably mounted on the door and an inboard end mounted adjacent the inboard occupant hip. A track extends longitudinally forward from the shoulder belt retractor and movably mounts a shoulder belt carriage which slidably engages the shoulder belt. A fixed length lift cable extends slidably through the shoulder belt carriage and has an upper end mounted on the roof rail and a lower end connected to the lap belt. A suitable drive device moves the shoulder belt carriage forwardly along the track when the door is opened to thereby dispose the shoulder belt forwardly of the occupant and move the lift cable upwardly and forwardly to lift the lap belt upwardly and forwardly from the seated occupant.

In one embodiment of the invention, the shoulder belt outboard end is attached to the roof rail and the track extends forwardly along the roof rail. In another embodiment of the invention, the outboard belt end is attached to the door window frame and the track extends forwardly along the door window frame.

Accordingly, the object, feature and advantage of the invention resides in the provision of a passive restraint system wherein a forwardly movable carriage slidably engages a shoulder belt and a fixed length lift cable slidable through the carriage has a fixed upper end and a lower end connected to the lap belt to lift the lap belt upwardly and forwardly during forward movement of the carriage upon opening movement of the door.

These and other objects, features and advantages of the invention will become apparent upon consideration of the specification and the appended drawings in which:

FIG. 1 is a perspective view of a vehicle body having the passive occupant restraint of this invention moved forwardly to an occupant access position when the door is in the open position; and FIG. 2 is a perspective view of the vehicle body having the restraint system established in the occupant restraining position when the door is in the closed position.

DESCRIPTION OF THE PREFERRED EMBODIMENT

Figure 1:
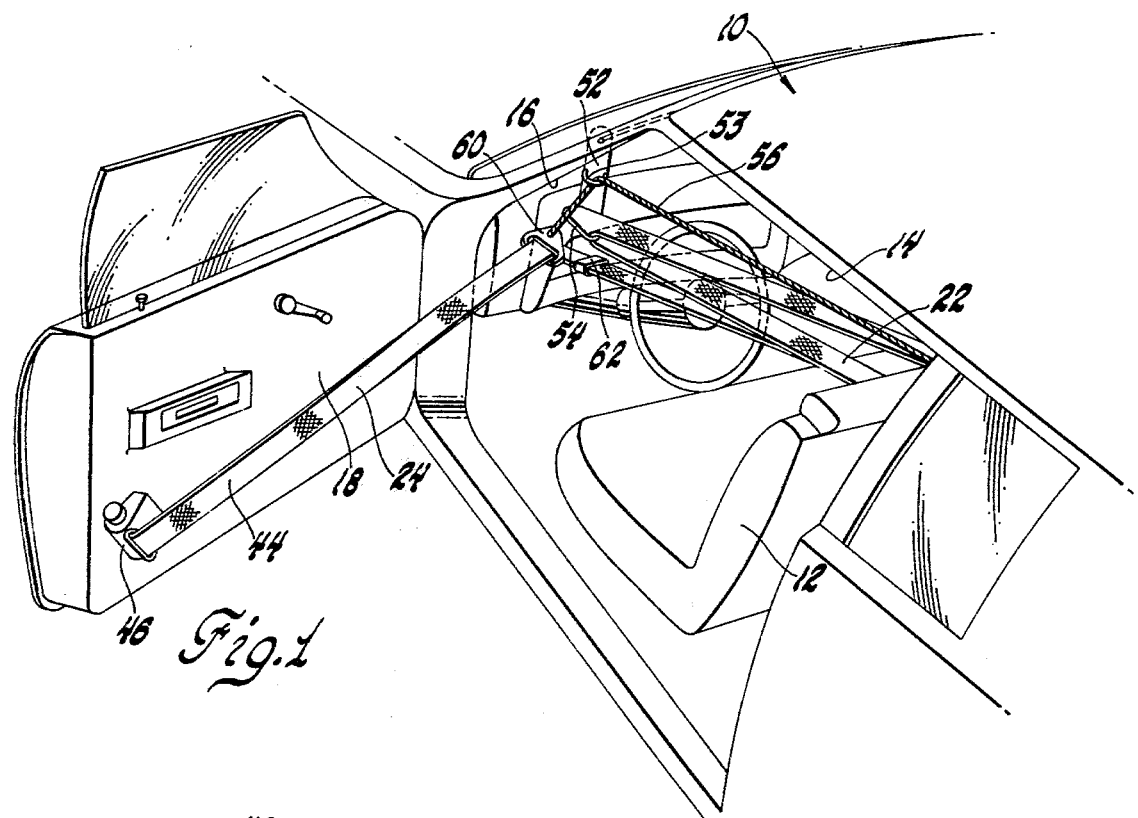

Referring to FIG. 1, there is shown a vehicle body 10 having a seat 12 located laterally adjacent a door opening defined in part by a longitudinally extending roof rail 14 and an angularly inclined windshield pillar 16. A door 18 is hingedly mounted on the vehicle body 10 for movement between an open position shown in FIG. 1 and a closed position shown in FIG. 2.

A passive occupant restraint system for restraining an occupant in the seat 12 includes a shoulder belt 22 and a lap belt 24. The shoulder belt 22 and lap belt 24 have respective inboard ends 26 and 28 which are joined together by attachment to a latch plate 30. An anchor belt 32 is suitably mounted on the vehicle body inboard the occupant seating position and carries a conventional emergency disconnect buckle 36 which couples with the latch plate 30.

As best seen in FIG. 1, the shoulder belt 22 has an outboard end 38 which is retractably mounted on the roof rail 14 by a retractor 40. The lap belt 24 has an outboard end 44 which is retractably mounted on the lower rearward portion of the door 18 generally adjacent the hip of the occupant by a lap belt retractor 46.

Figure 2:
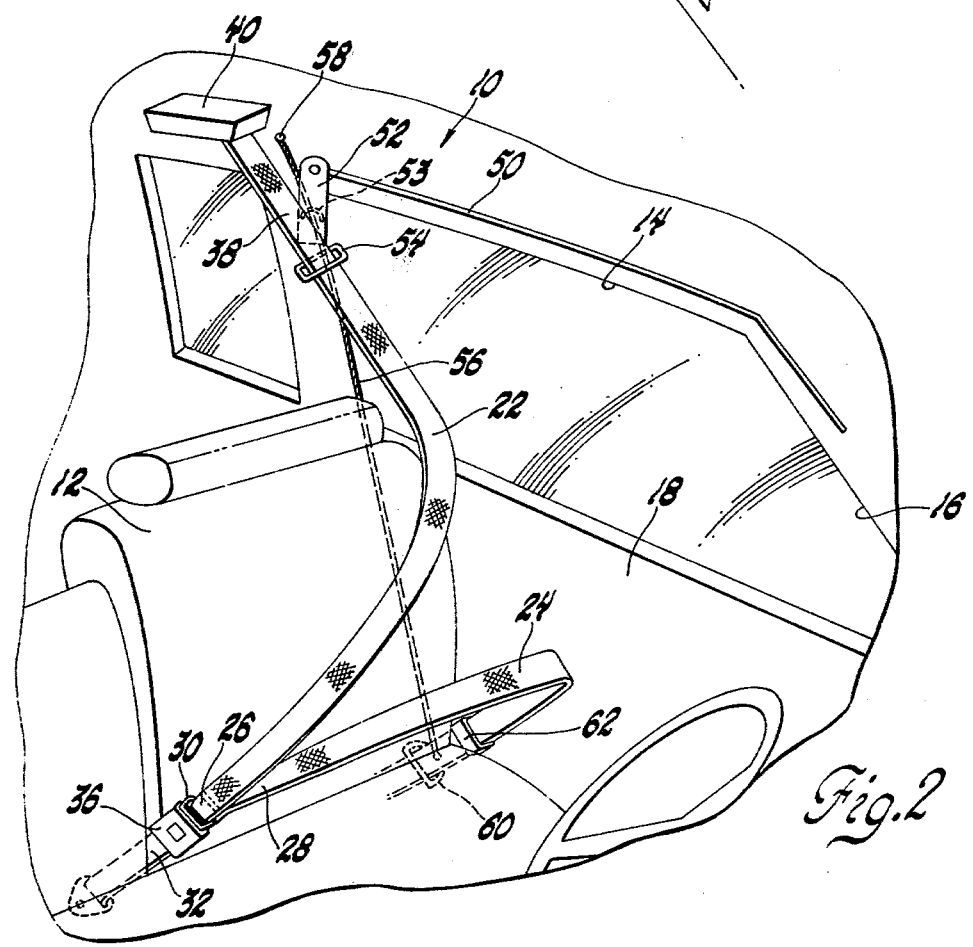

As best seen in FIG. 2, a track 50 extends longitudinally along the roof rail 14 and part way down the windshield pillar 16. A carriage 52 is movable along the track 50 and includes a guide loop 54 which slidably receives the shoulder belt 22 intermediate the inboard and outboard ends thereof. When the carriage 52 is located at its rearwardmost position of FIG. 2, the shoulder belt 22 assumes its normal occupant restraining position extending diagonally over the outboard shoulder of the occupant. The shoulder belt retractor 40 and the lap belt retractor 46 respectively adjust the shoulder belt 22 and lap belt 24 to fit the size and seating position of the particular seated occupant when the belt system is in the restraining position of FIG. 2.

A suitable drive mechanism, not shown, acts between the track 50 and carriage 52 to move the carriage back and forth along the track. The drive mechanism may be similar to that of U.S. Pat. Nos. Keppel et al 3,680,883 and Keppel et al 3,770,078, assigned to the assignee of this invention. The drive mechanism is responsive to an operative condition of the vehicle such as the vehicle ignition, placement of the transmission selector control in a driving position, latched or unlatched condition of the door lock associated with the door, or a door jam switch indicating door movement to or from the open and closed positions. In general, the drive mechanism establishes carriage 52 in its forward position of FIG. 1 when the door is open or the vehicle is in the inoperative condition. When the vehicle is in the operative condition or when the door is closed, the drive mechanism establishes the carriage 52 in the rearward position of FIG. 2.

A lift cable 56 or similar flexible element is provided for lifting the lap belt upwardly and forwardly when the carriage 52 is moved forwardly. As best seen in FIG. 2, the upper end of the lift cable 56 is attached to the roof rail 14 at 58. The lower end of the lift cable 56 is attached to a lift ring 60 which slidably encircles the lap belt 24. An intermediate portion of the lift cable 56 extends slidably through a slide loop 53 of carriage 52. A stop block 62 is carried on the lap belt 24 and is positioned as best seen in FIG. 2 to establish a normal position of the lift ring 60 adjacent the lap belt retractor 46 so that the lift cable 56 will lie adjacent the door 18.

Operation

Referring to FIG. 2, it is seen that when the carriage 52 is in its normal rearward position, the shoulder belt 22 is established in its normal occupant restraining position extending diagonally over the outboard shoulder of the occupant. Likewise, the lap belt 24 is established in its normal restraining position extending over the lower torso of the seated occupant.

When the door is opened to the position of FIG. 1, the outward swinging movement of the door 18 causes lap belt 24 to be unwound from the lap belt retractor 46. The opening movement of the door, or the sensing of some other indicia of vehicle inoperativeness causes the drive mechanism to move the carriage 52 forwardly to the position of FIG. 1. This forward movement of the carriage 52 unwinds shoulder belt 22 from the shoulder belt retractor 40 and establishes the shoulder belt 22 in the forwardly stowed position of FIG. 1. Simultaneously, the forward movement of the carriage 52 lifts the depending portion of the lift cable 56 to a stowed position along the roof rail 14 and, in so doing, foreshortens the downwardly depending portion of the lift cable 56 to lift the lift ring 60 upwardly and forwardly along a diagonal path of movement to the position of FIG. 1. Accordingly, the lap belt is lifted upwardly and forwardly to a stowed position facilitating occupant ingress and egress.

Thus, it is seen that the invention provides a new novel lap and shoulder belt arrangement wherein a drive mechanism for moving a shoulder belt carriage forwardly also foreshortens a lift cable attached to the roof rail to move the lap belt upwardly and forwardly away from the seated occupant.

While this invention has been disclosed primarily in terms of the specific embodiments shown in the drawings, it is not intended to be limited thereto but rather only to the extent set forth in the appended claims. For example, while the drawings show the track mounted extending longitudinally along the roof rail 14, it is within the scope of the invention to mount the outboard end of the shoulder belt and the upper end of the lift cable 56 on the vehicle body at the upper rear corner of the door window frame and to extend the track 50 longitudinally along the door window frame as shown in U.S. Pat. No. 3,882,955 Kaneko. Furthermore, although the drawings show the lap and shoulder belt retractor mounted at the outboard ends of their respective belts, it is within the scope of the invention to mount one or both of the retractors at the inboard end of its respective belt. Although the connection between the lift cable 56 and the lap belt 24 is shown as a slidable lift ring 60, the lift cable 56 may be attached to the lap belt in a non-slidable manner.

The embodiments of the invention in which an exclusive property or privilege is claimed are defined as follows:

1. In combination with a vehicle body having an occupant compartment in which an occupant seat is accessible through a door opening selectively opened and closed by a movable door, a passive occupant restraining belt arrangement comprising:
   a shoulder belt having an outboard end mounted on the vehicle body generally adjacent the occupant shoulder and an inboard end mounted on the vehicle body adjacent the inboard occupant hip;
   a retractor mounting one of said shoulder belt ends for extending and retracting the shoulder belt;
   a lap belt having an outboard end mounted on the door generally adjacent the outboard occupant hip and an inboard end mounted on the vehicle body generally adjacent the inboard occupant hip;
   a retractor mounting one of said lap belt ends for extending and retracting the lap belt;
   a track mounted on the vehicle body and extending longitudinally forward from the outboard shoulder belt end mounted on the vehicle body;
   a carriage slidably receiving the shoulder belt intermediate the inboard and outboard ends thereof and being movable along the track between a rearward position disposing the shoulder belt in a diagonal restraining position adjacent the occupant and a forward position disposing the shoulder belt generally forwardly of the occupant to facilitate occupant ingress and egress;
   and a flexible lift element of fixed length having an upper end mounted on the vehicle body generally adjacent the rearward position of the carriage and having a lower end connected to the lap belt, said lifter element extending slidably through the carriage whereby the lift element lifts the lap belt upwardly and forwardly of the occupant when the carriage is in the forward position and disposes the lap belt in a restraining position adjacent the occupant when the carriage is in the rearward position.

2. In combination with a vehicle body having an occupant compartment in which an occupant seat is accessible through a door opening formed in part by a roof rail and selectively opened and closed by a movable door, a passive occupant restraining belt arrangement comprising:
   a shoulder belt having an outboard end mounted on the vehicle body roof rail generally adjacent the occupant shoulder and an inboard end mounted on the vehicle body adjacent the inboard occupant hip;
   a retractor mounting one of said shoulder belt ends for extending and retracting the shoulder belt;

a lap belt having an outboard end mounted on the door generally adjacent the outboard occupant hip and an inboard end mounted on the vehicle body generally adjacent the inboard occupant hip;

a retractor mounting one of said lap belt ends for extending and retracting the lap belt;

a track mounted on the vehicle body roof rail and extending longitudinally forward from the outboard shoulder belt end mounted on the roof rail;

a carriage slidably receiving the shoulder belt intermediate the inboard and outboard ends thereof and being movable along the track between a rearward position disposing the shoulder belt in a diagonal restraining position adjacent the occupant and a forward position disposing the shoulder belt generally forwardly of the occupant to facilitate occupant ingress and egress;

and a flexible lift element of fixed length having an upper end mounted on the vehicle body roof rail generally adjacent the rearward position of the carriage and having a lower end connected to the lap belt, said lifter element extending slidably through the carriage whereby the lift element lifts the lap belt upwardly and forwardly of the occupant when the carriage is in the forward position and disposes the lap belt in a restraining position adjacent the occupant when the carriage is in the rearward position.

3. In combination with a vehicle body having an occupant compartment in which an occupant seat is accessible through a door opening formed in part by a roof rail and selectively opened and closed by a movable door, a passive occupant restraining belt arrangement comprising:

a shoulder belt having an outboard end mounted on the vehicle body roof rail by a retractor for extending and retracting the shoulder belt and an inboard end mounted on the vehicle body generally adjacent the inboard occupant hip;

a lap belt having an outboard end mounted on the door generally adjacent the outboard occupant hip by a retractor for extending and retracting the lap belt and an inboard end mounted on the vehicle body generally adjacent the inboard occupant hip;

a track extending longitudinally along the roof rail;

a carriage slidably receiving the shoulder belt intermediate the inboard and outboard ends thereof and being movable along the track;

a flexible lift element of fixed length extending slidably through the carriage and having an upper end mounted on the vehicle body generally adjacent the retractor and a lower end slidably associated with the lap belt;

and means for moving the carriage forwardly along the track to progressively move the shoulder belt away from the occupant and lift the lifter element upwardly and forwardly to lift the lap belt away from the occupant to facilitate ingress and egress, said means also moving the carriage rearwardly to progressively return the shoulder belt to restraining position closely adjacent the occupant and lower the lifter element to lower the lap belt onto the occupant.

* * * * *